United States Patent
Li et al.

(10) Patent No.: US 9,116,541 B2
(45) Date of Patent: Aug. 25, 2015

(54) METHOD OF DETERMINING WHETHER A LENS DEVICE IS SHIFTED AND OPTICAL TOUCH SYSTEM THEREOF

(71) Applicant: Wistron Corporation, New Taipei (TW)

(72) Inventors: Chun-Chieh Li, New Taipei (TW); Yu-Yen Chen, New Taipei (TW)

(73) Assignee: Wistron Corporation, Hsichih, New Taipei (TW)

(*) Notice: Subject to any disclaimer, the term of this patent is extended or adjusted under 35 U.S.C. 154(b) by 350 days.

(21) Appl. No.: 13/873,244

(22) Filed: Apr. 30, 2013

(65) Prior Publication Data

US 2014/0125996 A1    May 8, 2014

(30) Foreign Application Priority Data

Nov. 8, 2012    (TW) .............................. 101141615 A (51) Int. Cl.
*G06F 3/042*    (2006.01)
*G06F 3/00*    (2006.01)

(52) U.S. Cl.
CPC ........................................ *G06F 3/00* (2013.01)

(58) Field of Classification Search
CPC ....... G06F 3/0421; G01B 11/00; G01B 11/14
USPC ........................................ 345/175; 178/18.09
See application file for complete search history.

(56) References Cited

U.S. PATENT DOCUMENTS

| 6,900,951 | B2 | 5/2005 | Amanai |
| 8,928,608 | B2* | 1/2015 | Ye et al. .......................... 345/173 |
| 2011/0187678 | A1* | 8/2011 | Salaverry et al. ............. 345/175 |

* cited by examiner

*Primary Examiner* — Jimmy H Nguyen
(74) *Attorney, Agent, or Firm* — Winston Hsu; Scott Margo (57) ABSTRACT

A method of determining whether a lens device is shifted is applied to an optical touch system including a screen, a first light source and a first lens device respectively disposed corresponding to a first corner of a touch surface of the screen, and first and second optical strips respectively disposed at first and second sides of the touch surface. The method includes the first lens device setting a first brightness threshold according to a first original image captured by the first lens device toward the touch surface, disposing first and second reflection members at one end of the first optical strip and one end of the second optical strip respectively, and the first lens device determining whether a first optical axis of the first lens device is shifted according to the first brightness threshold and a first actual image captured by the first lens device.

20 Claims, 4 Drawing Sheets

METHOD OF DETERMINING WHETHER A LENS DEVICE IS SHIFTED AND OPTICAL TOUCH SYSTEM THEREOF

BACKGROUND OF THE INVENTION

1. Field of the Invention

The present invention relates to a determining method and an optical touch system thereof, and more specifically, to a method of determining whether a lens device is shifted and an optical touch system thereof.

2. Description of the Prior Art

In general, a conventional optical touch system utilizes a light interruption method or a direct image capturing method to detect a position of a user's finger on a touch surface. Both of the two methods utilize lens devices (e.g. a CMOS (Complementary Metal-Oxide Semiconductor) sensor) and light sources (e.g. a near-infrared light emitting device) to perform optical positioning of the optical touch system. The aforesaid lens devices are usually disposed at upper-left and upper-right corners of a touch screen, respectively. The difference between the two methods is that the light interruption method utilizes a background lighting design, in which reflection strips are disposed around the touch screen. In the light interruption method, a user's finger is taken as an interruption object for interrupting light when touching the touch screen. At this time, a pixel position with lower brightness of an image captured by the lens device could be determined as a position of the user's finger on the touch screen. On the other hand, the direct image capturing method utilizes a light absorbing design, in which mat strips are disposed around the touch screen. In the direct image capturing method, a user's finger is taken as a reflection object for reflecting light when touching the touch screen. At this time, a pixel position with higher brightness of an image captured by the lens device could be determined as a position of the user's finger on the touch screen.

The optical positioning accuracy of the aforesaid two methods depends on whether an image capturing range of the lens device covers the whole the touch surface. However, offset of an optical axis of the lens device from its original position usually occurs due to some factor (e.g. the optical touch system receiving sudden impact or poor assembly of the optical touch system). The aforesaid problem may cause incorrect optical positioning of the optical touch system.

SUMMARY OF THE INVENTION

An objective of the present invention is to provide a method of determining whether a lens device is shifted and an optical touch system thereof to solve the aforesaid problem.

The present invention provides a method of determining whether a lens device is shifted. The method is applied to an optical touch system. The optical touch system includes a screen, a first light source, a first lens device, a first optical strip, and a second optical strip. The screen has a touch surface having a first corner and first and second sides opposite to the first corner. The first lens device has a first optical axis. The first light source and the first lens device are disposed at a position corresponding to the first corner. The first and second optical strips are disposed at the first and second sides respectively. The method includes the first lens device capturing a first original image toward the touch surface, the first lens device setting a first brightness threshold according to the first original image, disposing a first reflection member and a second reflection member at one end of the first optical strip relatively close to the first corner and one end of the second optical strip relatively close to the first corner respectively, the first lens device capturing a first actual image toward the touch surface, and the first lens device determining whether the first optical axis is shifted according to number of pixels, the brightness of which is greater or less than the first brightness threshold, in the first original image. A reflectance of the first reflection member and a reflectance of the second reflection member are different from a reflectance of the first optical strip and a reflectance of the second optical strip.

According to the claimed invention, the first optical strip and the second optical strip are a mat strip or a reflection strip. The reflectance of the first reflection member and the reflectance of the second reflection member are greater than the reflectance of the first optical strip and the reflectance of the second optical strip. The step of the first lens device determining whether the first optical axis is shifted according to the number of the pixels in the first actual image includes the first lens device determining that the first optical axis has been shifted when the first lens device detects that the number of the pixels in the first actual image is greater or less than 2, the brightness of the pixels being greater than the first brightness threshold.

According to the claimed invention, the step of the first lens device setting the first brightness threshold according to the first original image includes the first lens device calculating the first brightness threshold by increasing an average brightness of the first original image according to a specific ratio.

According to the claimed invention, the first optical strip and the second optical strip are a mat strip or a reflection strip. The reflectance of the first reflection member and the reflectance of the second reflection member are less than the reflectance of the first optical strip and the reflectance of the second optical strip. The step of the first lens device determining whether the first optical axis is shifted according to the number of the pixels in the first actual image includes the first lens device determining that the first optical axis has been shifted when the first lens device detects that the number of the pixels in the first actual image is greater or less than 2, the brightness of the pixels being less than the first brightness threshold.

According to the claimed invention, the step of the first lens device setting the first brightness threshold according to the first original image includes the first lens device calculating the first brightness threshold by decreasing an average brightness of the first original image according to a specific ratio.

According to the claimed invention, the optical touch system further includes a second light source, a second lens device, and a third optical strip. The second lens device has a second optical axis. The touch surface further has a second corner and a third side. The second corner is opposite to the third side. The second light source and the second lens device are disposed at a position corresponding to the second corner. The third optical strip is disposed at the third side. The method further includes the second lens device capturing a second original image toward the touch surface, the second lens device setting a second brightness threshold according to the second original image, disposing a third reflection member and a fourth reflection member at one end of the first optical strip relatively close to the second corner and one end of the third optical strip relatively close to the second corner respectively, the second lens device capturing a second actual image toward the touch surface, and the second lens device determining whether the second optical axis is shifted according to the number of the pixels in the second actual image, the brightness of the pixels being greater or less than the second brightness threshold. A reflectance of the third reflection member and a reflectance of the fourth reflection member are different from the reflectance of the first optical strip and a reflectance of the third optical strip;

According to the claimed invention, the first optical strip, the second optical strip and the third optical strip are a mat strip or a reflection strip. The reflectance of the first reflection member, the reflectance of the second reflection member, the reflectance of the third reflection member, and the reflectance of the fourth reflection member are greater than the reflectance of the first optical strip, the reflectance of the second optical strip, and the reflectance of the third optical strip. The first lens device determines that the first optical axis has been shifted when the first lens device detects that the number of the pixels in the first actual image is greater or less than 2, the brightness of the pixels being greater than the first brightness threshold. The second lens device determines that the second optical axis has been shifted when the second lens device detects that the number of the pixels in the second actual image is greater or less than 2, the brightness of the pixels being greater than the second brightness threshold.

According to the claimed invention, the step of the first lens device setting the first brightness threshold according to the first original image includes the first lens device calculating the first brightness threshold by increasing an average brightness of the first original image according to a specific ratio. The step of the second lens device setting the second brightness threshold according to the second original image includes the second lens device calculating the second brightness threshold by increasing an average brightness of the second original image according to a specific ratio.

According to the claimed invention, the first optical strip, the second strip and the third optical strip are a mat strip or a reflection strip. The reflectance of the first reflection member, the reflectance of the second reflection member, the reflectance of the third reflection member, and the reflectance of the fourth reflection member are less than the reflectance of the first optical strip, the reflectance of the second optical strip, and the reflectance of the third optical strip. The first lens device determines that the first optical axis has been shifted when the first lens device detects that the number of the pixels in the first actual image is greater or less than 2, the brightness of the pixels being less than the first brightness threshold. The second lens device determines that the second optical axis has been shifted when the second lens device detects that the number of the pixels in the second actual image is greater or less than 2, the brightness of the pixels being less than the second brightness threshold.

According to the claimed invention, the step of the first lens device setting the first brightness threshold according to the first original image includes the first lens device calculating the first brightness threshold by decreasing an average brightness of the first original image according to a specific ratio. The step of the second lens device setting the second brightness threshold according to the second original image includes the second lens device calculating the second brightness threshold by decreasing an average brightness of the second original image according to a specific ratio.

The present invention further provides an optical touch system for determining whether a lens device is shifted. The optical touch system includes a screen, a first light source, a first optical strip, a second optical strip, a first reflection member, a second reflection member, and a first lens device. The screen has a touch screen. The touch surface has a first corner, a first side, and a second side. The first and second sides are opposite to the first corner. The first light source is disposed at a position corresponding to the first corner for emitting light toward the touch surface. The first optical strip is disposed at the first side. The second optical strip is disposed at the second side. The first reflection member is disposed one end of the first optical strip relatively close to the first corner. The second reflection member is disposed one end of the second optical strip relatively close to the first corner. A reflectance of the first reflection member and a reflectance of the second reflection member are different from a reflectance of the first optical strip and a reflectance of the second optical strip. The first lens device is disposed at a position corresponding to the first corner and has a first optical axis for capturing a first original image toward the touch surface and a first actual image corresponding to the first reflection member and the second reflection member. The first lens device is further used for setting a first brightness threshold according to the first original image and determining whether the first optical axis is shifted according to number of pixels in the first actual image, the brightness of the pixels being greater or less than the first brightness threshold.

According to the claimed invention, the first optical strip and the second optical strip are a mat strip or a reflection strip. The reflectance of the first reflection member and the reflectance of the second reflection member are greater than the reflectance of the first optical strip and the reflectance of the second optical strip. The first lens device is used for determining that the first optical axis has been shifted when the first lens device detects that the number of the pixels in the first actual image is greater or less than 2, the brightness of the pixels being greater than the first brightness threshold.

According to the claimed invention, the first lens device is used for calculating the first brightness threshold by increasing an average brightness of the first original image according to a specific ratio.

According to the claimed invention, the first optical strip and the second optical strip are a mat strip or a reflection strip. The reflectance of the first reflection member and the reflectance of the second reflection member are less than the reflectance of the first optical strip and the reflectance of the second optical strip. The first lens device is used for determining that the first optical axis has been shifted when the first lens device detects that the number of the pixels in the first actual image is greater or less than 2, and the brightness of the pixels is less than the first brightness threshold.

According to the claimed invention, the first lens device is used for calculating the first brightness threshold by decreasing an average brightness of the first original image according to a specific ratio.

According to the claimed invention, the touch surface further has a second corner and a third side. The second corner is opposite to the third side. The optical touch system further includes a second light source, a third reflection member, a fourth reflection member, and a second lens device. The second light source is disposed at a position corresponding to the second corner for emitting light toward the touch surface. The third optical strip is disposed at the third side. The third reflection member is disposed at one end of the first optical strip relatively close to the second corner. The fourth reflection member is disposed at one end of the third optical strip relatively close to the second corner. A reflectance of the third reflection member and a reflectance of the fourth reflection member are different from the reflectance of the first optical strip and a reflectance of the third optical strip. A second lens device is disposed at a position corresponding to the second corner and having a second optical axis for capturing a second original image toward the touch surface and a second actual image corresponding to the third reflection member and the fourth reflection member. The second lens device is further used for setting a second brightness threshold according to the second original image and determining whether the second optical axis is shifted according to the number of the pixels in the second actual image, the brightness of the pixels being greater or less than the second brightness threshold.

According to the claimed invention, the first optical strip, the second optical strip and the third optical strip are a mat strip or a reflection strip. The reflectance of the first reflection member, the reflectance of the second reflection member, the reflectance of the third reflection member, and the reflectance of the fourth reflection member are greater than the reflectance of the first optical strip, the reflectance of the second optical strip, and the reflectance of the third optical strip. The first lens device is used for determining that the first optical axis has been shifted when the first lens device detects that the number of the pixels in the first actual image is greater or less than 2, and the brightness of the pixels being greater than the first brightness threshold. The second lens device is used for determining that the second optical axis has been shifted when the second lens device detects that the number of the pixels in the second actual image is greater or less than 2, and the brightness of the pixels is greater than the second brightness threshold.

According to the claimed invention, the first lens device is used for calculating the first brightness threshold by increasing an average brightness of the first original image according to a specific ratio. The second lens device is used for calculating the second brightness threshold by increasing an average brightness of the second original image according to a specific ratio.

According to the claimed invention, the first optical strip, the second optical strip and the third optical strip are a mat strip or a reflection strip. The reflectance of the first reflection member, the reflectance of the second reflection member, the reflectance of the third reflection member, and the reflectance of the fourth reflection member are less than the reflectance of the first optical strip, the reflectance of the second optical strip, and the reflectance of the third optical strip. The first lens device is used for determining that the first optical axis has been shifted when the first lens device detects that the number of the pixels in the first actual image is greater or less than 2, and the brightness of the pixels is less than the first brightness threshold. The second lens device is used for determining that the second optical axis has been shifted when the second lens device detects that the number of the pixels in the second actual image is greater or less than 2, and the brightness of pixels is less than the second brightness threshold.

According to the claimed invention, the first lens device is used for calculating the first brightness threshold by decreasing an average brightness of the first original image according to a specific ratio. The second lens device is used for calculating the second brightness threshold by decreasing an average brightness of the second original image according to a specific ratio.

Compared with the prior art, the present invention utilizes the design that the optical strip has the reflection members disposed thereon and the reflectances of the reflection members are different from the reflectances of the optical strips, to determine whether the optical axis of the lens device is shifted according to number of the pixels, brightness of which is greater or less than the brightness threshold set based on the original image, in the actual image captured by the lens device, so that a maintenance worker (or an assembly worker) could precisely know whether the image capturing range of the lens device cover the whole touch surface for determining whether to adjust the installation angle of the lens device or replace the lens device. In such a manner, the optical positioning accuracy and the yield rate of the optical touch system could be improved greatly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
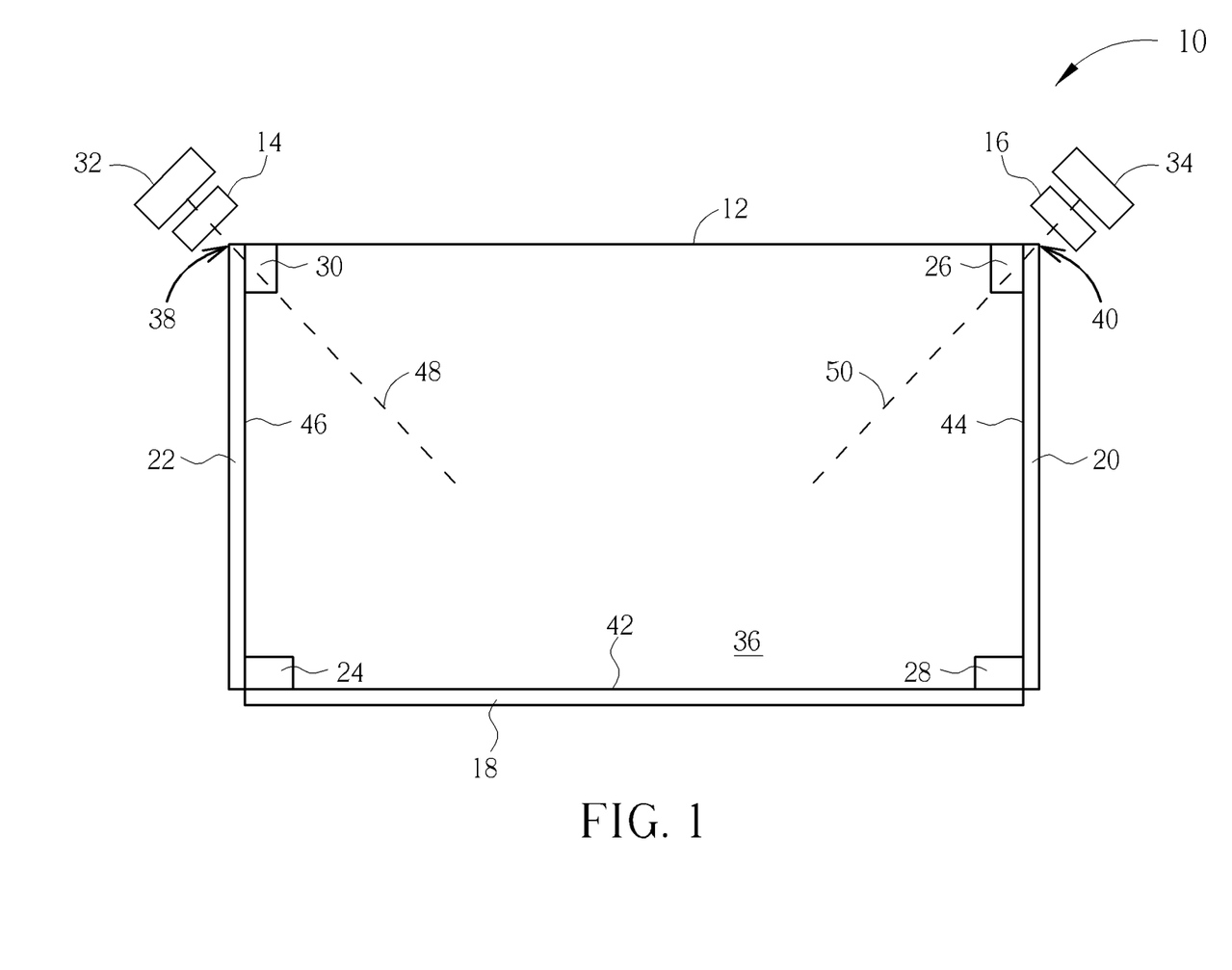
FIG. 1 is a diagram of an optical touch system according to an embodiment of the present invention.

Please refer to FIG. 1, which is a diagram of an optical touch system 10 according to an embodiment of the present invention. As shown in FIG. 1, the optical touch system 10 includes a screen 12, a first light source 14, a second light source 16, a first optical strip 18, a second optical strip 20, a third optical strip 22, a first reflection member 24, a second reflection member 26, a third reflection member 28, a fourth reflection member 30, a first lens device 32, and a second lens device 34. The screen 12 could be a display device of a conventional optical touch apparatus, such as a liquid crystal display screen, and has a touch surface 36. The touch surface 36 has a first corner 38, a second corner 40, a first side 42, a second side 44, and a third side 46. The first side 42 and the second side 44 are opposite to the first corner 38. The second side 44 and the third side 46 are opposite to the second corner 40.

The first light source 14 is disposed at a position corresponding to the first corner 38, and the second light source 16 is disposed at a position corresponding to the second corner 40. The first light source 14 and the second light source 16 could be a light emitting component commonly applied to a conventional optical touch apparatus, such as a near-infrared light emitting device, for emitting light toward the touch surface 36. The first optical strip 18, the second optical strip 20, and the third optical strip 22 are disposed at the first side 42, the second side 44, and the third side 46 respectively. In this embodiment, the optical touch system 10 preferably utilizes a light interruption method, meaning that the first optical strip 18, the second optical strip 20, and the third optical strip 22 could be preferably a mat strip for diffusing light of the first light source 14 and the second light source 16 toward the touch surface 36.

As shown in FIG. 1, the first reflection member 24 and the second reflection member 26 are disposed at one end of the first optical strip 18 relatively close to the first corner 38 and one end of the second optical strip 20 relatively close to the first corner 38 respectively, and the third reflection member 28 and the fourth reflection member 30 are disposed at one end of the first optical strip 18 relatively close to the second corner 40 and one end of the third optical strip 22 relatively close to the second corner 40 respectively. In this embodiment, a reflectance of the first reflection member 24, a reflectance of the second reflection member 26, a reflectance of the third reflection member 28, and a reflectance of the fourth reflection member 30 are preferably greater than a reflectance of the first optical strip 18, a reflectance of the second optical strip 20, and a reflectance of the third optical strip 22.

The first lens device 32 is disposed at a position corresponding to the first corner 38 and has a first optical axis 48. The second lens device 34 is disposed at a position corresponding to the second corner 40 and has a second optical axis 50. In the embodiment of the reflectances of the first reflection member 24, the second reflection member 26, the reflection member 28, and the fourth reflection member 30 being greater than the reflectances of the first optical strip 18, the second optical strip 20, and the third optical strip 22, the first lens device 32 is used for capturing an original image and an actual image corresponding to the first reflection member 24 and the second reflection member 26 toward the touch surface 36, setting a corresponding brightness threshold according to the captured original image, and determining whether the first optical axis 48 is shifted according to number of the pixels, the brightness of which is greater than the brightness threshold, in the captured actual image, and the second lens device 34 is used for capturing an original images and an actual image corresponding to the third reflection member 28 and the fourth reflection member 30 toward the touch surface 36, setting a corresponding brightness threshold according to the captured original image, and determining whether the second optical axis 50 is shifted according to number of the pixels, the brightness of which is greater than the brightness threshold, in the captured actual image. In this embodiment, the first lens device 32 and the second lens device 34 are an image capturing device commonly applied to a conventional optical touch apparatus, such as a CMOS sensor.

Figure 2:
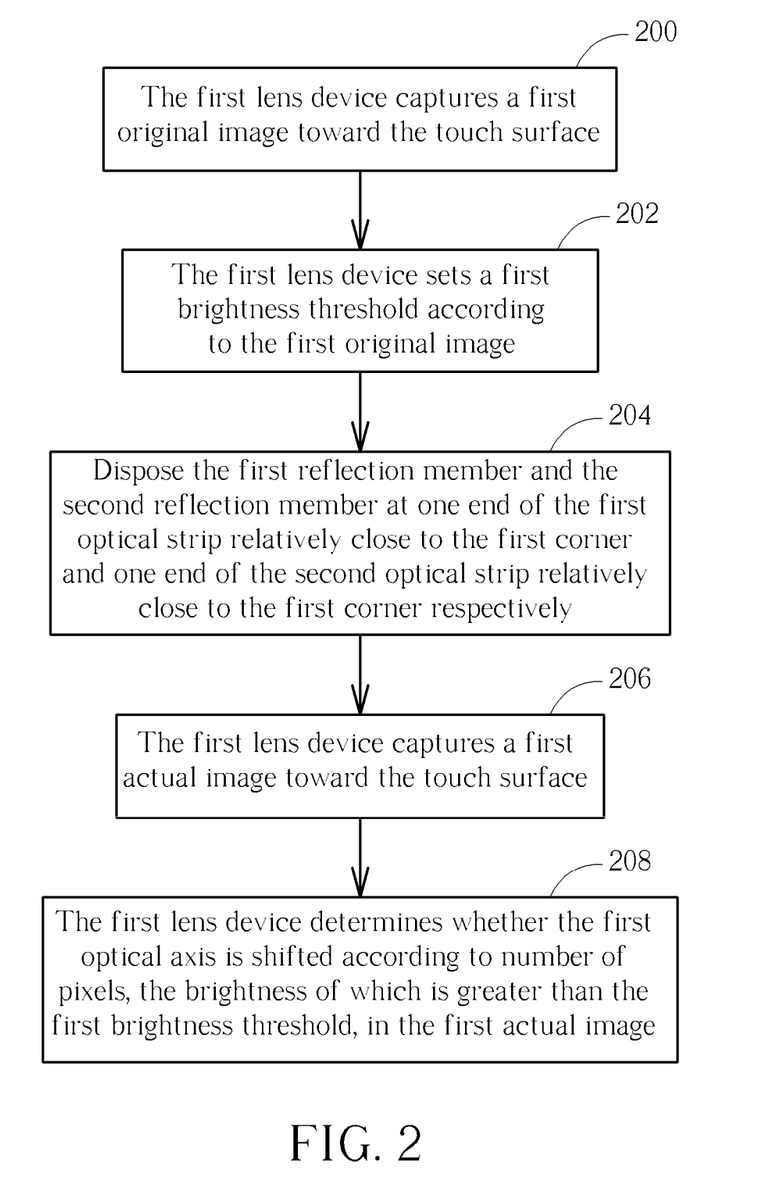
FIG. 2 is a flowchart of a method of utilizing the optical touch system in FIG. 1 to determine whether a first optical axis of a first lens device is shifted.

Please refer to FIG. 2, which is a flowchart of a method of utilizing the optical touch system 10 in FIG. 1 to determine whether the first optical axis 48 of the first lens device 32 is shifted. The method includes the following steps.

Step 200: The first lens device 32 captures a first original image toward the touch surface 36;

Step 202: The first lens device 32 sets a first brightness threshold according to the first original image;

Step 204: Disposing the first reflection member 24 and the second reflection member 26 at one end of the first optical strip 28 relatively close to the first corner 38 and one end of the second optical strip 20 relatively close to the first corner 38 respectively;

Step 206: The first lens device 32 captures a first actual image toward the touch surface 36;

Step 208: The first lens device 32 determines whether the first optical axis 48 is shifted according to number of pixels, the brightness of which is greater than the first brightness threshold, in the first actual image.

Figure 3:
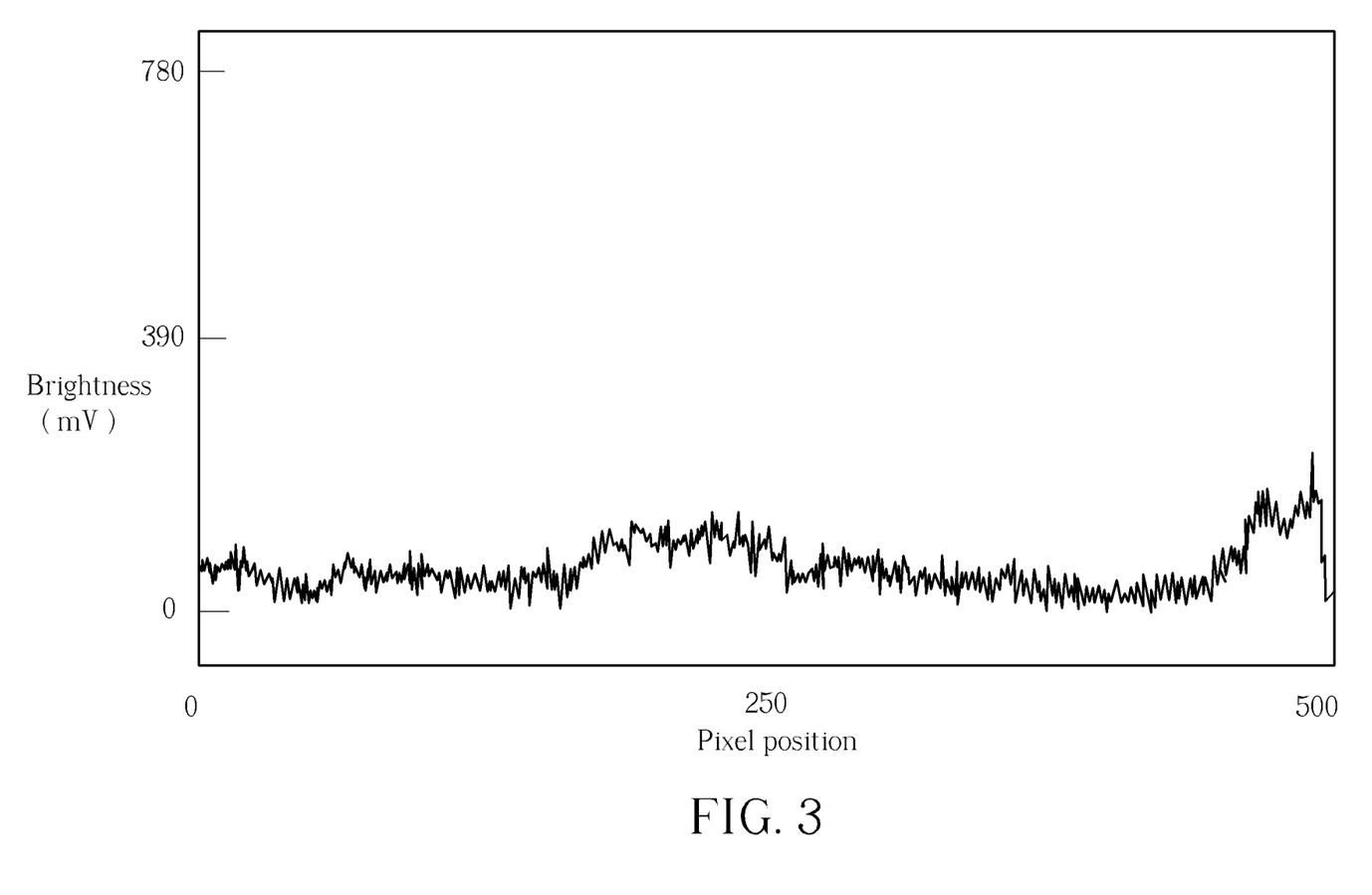
FIG. 3 illustrates a relationship of pixel position and brightness of a first original image captured by the first lens device in FIG. 1 when a first reflection member, a second reflection member, a third reflection member, and a fourth reflection member have not been disposed on the optical touch system.
Figure 4:
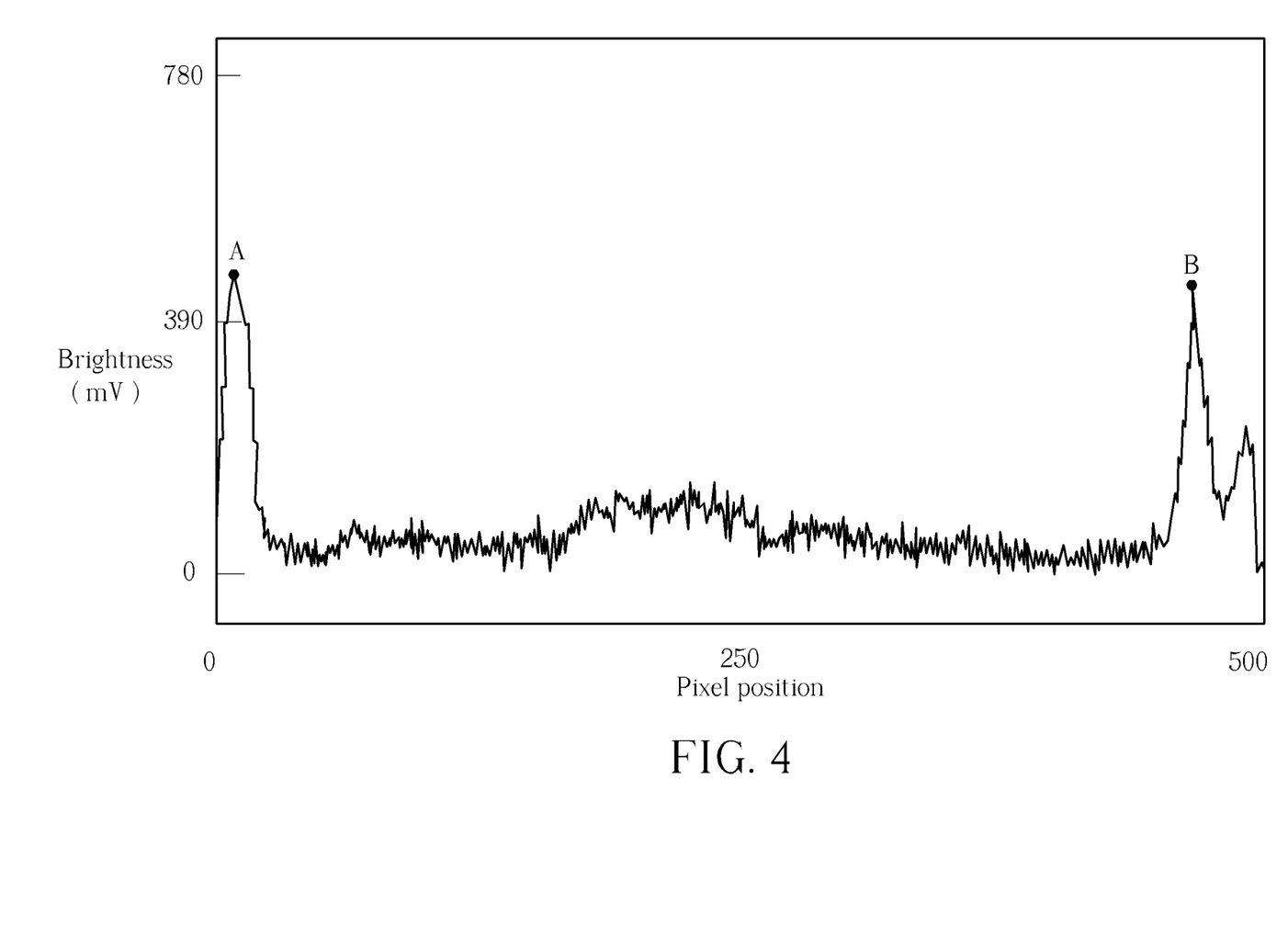
FIG. 4 illustrates a relationship of pixel position and brightness of a first actual image captured by the first lens device in FIG. 1 when the first reflection member, the second reflection member, the third reflection member, and the fourth reflection member have been disposed on the optical touch system.

More detailed description for the aforesaid steps is provided as follows. Please refer to FIG. 1, FIG. 2, FIG. 3, and FIG. 4. FIG. 3 illustrates a relationship of pixel position and brightness of the first original image captured by the first lens device 32 in FIG. 1 when the first reflection member 24, the second reflection member 26, the third reflection member 28, and the fourth reflection member 30 have not been disposed on the optical touch system 10. FIG. 4 illustrates a relationship of pixel position and brightness of the first actual image captured by the first lens device 32 in FIG. 1 when the first reflection member 24, the second reflection member 26, the third reflection member 28, and the fourth reflection member 30 have been disposed on the optical touch system 10. Before disposing the first reflection member 24 and the second reflection member 26, the first brightness threshold needs to be set in advance. To be more specific, the optical touch system 10 could utilize the first lens device 32 to capture the first original image toward the touch surface (Step 200) when the first reflection member 24, the second reflection member 26, the third reflection member 28, and the fourth reflection member 30 have not been disposed on the optical touch system 10. The relationship of pixel position and brightness of the first original image captured by the first lens device 32 could be as shown in FIG. 3.

Subsequently, the first lens device 32 could set the first brightness threshold according to the first original image as a reference of determining whether the first optical axis 48 is shifted. For example, the first lens device 32 could average a brightness of each pixel position in FIG. 3 to calculate an average brightness of the first original image, and then increase the average brightness by a specific ratio (e.g. 25%) to generate the first brightness threshold. To be noted, all designs of setting the first brightness threshold according to the first original image could be utilized by the present invention, such as calculating the first brightness threshold according to the sum of the aforesaid average brightness and a specific value.

After the first lens device 32 sets the first brightness threshold, the first reflection member 24 and the second reflection member 26 could be disposed at the end of the first optical strip 18 relatively close to the first corner 38 and the end of the second optical strip 20 relatively close to the first corner 38 respectively (Step 204), meaning that the first reflection member 24 and the second reflection member 26 are located at the down-left corner and the upper-right corner of the touch surface 36, and the first lens device 32 could be utilized to capture the first actual image toward the touch surface 36 (Step 206). The relationship of pixel position and brightness of the first actual image captured by the first lens device 32 could be as shown in FIG. 4.

Finally, in Step 208, the first lens device 32 could determine whether the first optical axis 48 is shifted according to number of the pixels, brightness of which is greater than the first brightness threshold, in the first actual image. To be more specific, via the design that the reflectances of the first reflection member 24 and the second reflection member 26 are greater than the reflectances of the first optical strip 18 and the second optical strip 20, the first lens device 32 could determine whether the first optical axis 48 is shifted when number of the pixels, brightness of which is greater than the first brightness threshold, in the first actual image is greater or less than 2. That is, if the first optical axis 48 is not shifted, peaks A and B respectively corresponding to the first reflection member 24 and the second reflection member 26 could appear in the relationship diagram of pixel position and brightness of the first actual image captured by the first lens device 32 (as shown in FIG. 4), so that the first lens device 32 could determines that number of the pixels, brightness of which is greater than the first brightness threshold, is equal to 2. Accordingly, the first lens device 32 could precisely determine that the first optical axis 48 is not shifted.

On the other hand, if the first optical axis 48 has been shifted, one (or more than two) peaks may appear in the relationship diagram of pixel position and brightness of the first actual image captured by the first lens device 32 since the image capturing range of the first lens device 32 could not cover the whole touch surface 36, but could partially cover the background of the optical touch system 10. Accordingly, the first lens device 32 could determine that number of the pixels, brightness of which is greater than the first brightness threshold, in the first actual image is less than 2 or greater than 2, so as to determine that the first optical axis 48 has been shifted.

In summary, via the aforesaid steps, the present invention could determine the first optical axis of the first lens device is shifted according to number of the pixels, brightness of which is greater than the first brightness threshold, in the first actual image, so that a maintenance worker (or an assembly worker) could precisely know whether the image capturing range of the first lens device covers the whole touch surface for determining whether to adjust the installation angle of the first lens device or replace the first lens device. In such a manner, the optical positioning accuracy and the yield rate of the optical touch system 10 could be improved greatly.

Description for the optical touch system 10 determining whether the second optical axis 50 of the second lens device 34 is shifted could be reasoned according to the aforesaid steps. In brief, the optical touch system 10 could utilize the second lens device 34 to capture a second original image toward the touch surface 36 when the third reflection member 28 and the fourth reflection member 30 have not been disposed on the optical touch system 10, and then the second lens device 34 could set a second brightness threshold according to the second original image. As for the related setting process, it could be reasoned according to Step 202 and the related description is omitted herein.

After the second lens device 34 sets the second brightness threshold, the third reflection member 28 and the fourth reflection member 30 could be disposed at the end of the first optical strip 18 relatively close to the second corner 40 and the end of the third optical strip 22 relatively close to the second corner 40 respectively, meaning that the third reflection member 28 and the fourth reflection member 30 are located at the upper-left corner and the down-right corner of the touch surface 36, and the second lens device 34 could be utilized to capture a second actual image toward the touch surface 36.

Finally, the second lens device 32 could determine whether the second optical axis 50 is shifted according to number of the pixels, brightness of which is greater than the second brightness threshold, in the second actual image. To be more specific, via the design that the reflectances of the third reflection member 28 and the fourth reflection member 30 are greater than the reflectances of the first optical strip 18 and the third optical strip 22, the second lens device 34 could determine whether the second optical axis 50 is shifted when number of the pixels, brightness of which is greater than the second brightness threshold, in the second actual image is greater or less than 2. As for the related determining process, it could be reasoned according to Step 208 and the related description is omitted herein. In such a manner, the present invention could determine the second optical axis of the second lens device is shifted according to number of the pixels, brightness of which is greater than the second brightness threshold, in the second actual image, so that a maintenance worker (or an assembly worker) could precisely know whether the image capturing range of the second lens device covers the whole touch surface for determining whether to adjust the installation angle of the second lens device or replace the second lens device. Accordingly, the optical positioning accuracy and the yield rate of the optical touch system 10 could be improved greatly.

It should be mentioned that the design of the reflectances of the reflection members being different from the reflectances of the optical strips is not limited to the aforesaid embodiment. For example, in another embodiment, if the first optical strip 18, the second optical strip 20, and the third optical strip 22 are a mat strip respectively, the optical touch system 10 could utilize the design that the reflectances of the first reflection member 24, the second reflection member 26, the third reflection member 28, and the fourth reflection member 30 are less than the reflectances of the first optical strip 18, the second optical strip 20, and the third optical strip 22, and the first brightness threshold and the second brightness threshold could be calculated by decreasing the average brightness of the first original image and the average brightness of the second original image according to a specific ratio. In such a manner, the first lens device 32 could determine whether the first optical axis 48 is shifted according to number of the pixels, brightness of which is less than the first brightness threshold, in the first actual image, and the second lens device 34 could determine whether the second optical axis 50 is shifted according to number of the pixels, brightness of which is less than the second brightness threshold, in the second actual image.

Furthermore, in another embodiment, if the first optical strip 18, the second optical strip 20, and the third optical strip 22 are a reflection strip respectively, meaning that the optical touch system 10 utilizes the aforesaid light interruption method instead, the optical touch system 10 could utilize the design that the reflectances of the first reflection member 24, the second reflection member 26, the third reflection member 28, and the fourth reflection member 30 are less than the reflectances of the first optical strip 18, the second optical strip 20, and the third optical strip 22, and the first brightness threshold and the second brightness threshold could be calculated by increasing the average brightness of the first original image and the average brightness of the second original image according to a specific ratio respectively. In such a manner, the first lens device 32 could determine whether the first optical axis 48 is shifted according to number of the pixels, brightness of which is less than the first brightness threshold, in the first actual image, and the second lens device 34 could determine whether the second optical axis 50 is shifted according to number of the pixels, brightness of which is less than the second brightness threshold, in the second actual image.

Furthermore, in another embodiment, if the first optical strip 18, the second optical strip 20, and the third optical strip 22 are a reflection strip respectively, meaning that the optical touch system 10 utilizes the aforesaid light interruption method instead, the optical touch system 10 could utilize the design that the reflectances of the first reflection member 24, the second reflection member 26, the third reflection member 28, and the fourth reflection member 30 are greater than the reflectances of the first optical strip 18, the second optical strip 20, and the third optical strip 22, and the first brightness threshold and the second brightness threshold could be calculated by increasing the average brightness of the first original image and the average brightness of the second original image according to a specific ratio respectively. In such a manner, the first lens device 32 could determine whether the first optical axis 48 is shifted according to number of the pixels, brightness of which is greater than the first brightness threshold, in the first actual image, and the second lens device 34 could determine whether the second optical axis 50 is shifted according to number of the pixels, brightness of which is greater than the second brightness threshold, in the second actual image.

Compared with the prior art, the present invention utilizes the design that the optical strip has the reflection members disposed thereon and the reflectances of the reflection members are different from the reflectances of the optical strips, to determine whether the optical axis of the lens device is shifted according to number of the pixels, brightness of which is greater or less than the brightness threshold set based on the original image, in the actual image captured by the lens device, so that a maintenance worker (or an assembly worker) could precisely know whether the image capturing range of the lens device cover the whole touch surface for determining whether to adjust the installation angle of the lens device or replace the lens device. In such a manner, the optical positioning accuracy and the yield rate of the optical touch system could be improved greatly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of determining whether a lens device is shifted, the method being applied to an optical touch system, the optical touch system comprising a screen, a first light source, a first lens device, a first optical strip, and a second optical strip, the screen having a touch surface having a first corner and first and second sides opposite to the first corner, the first lens device having a first optical axis, the first light source and the first lens device being disposed at a position corresponding to the first corner, the first and second optical strips being disposed at the first and second sides respectively, the method comprising:

the first lens device capturing a first original image toward the touch surface;

the first lens device setting a first brightness threshold according to the first original image;

disposing a first reflection member and a second reflection member at one end of the first optical strip relatively close to the first corner and one end of the second optical strip relatively close to the first corner respectively, a reflectance of the first reflection member and a reflectance of the second reflection member being different from a reflectance of the first optical strip and a reflectance of the second optical strip;

the first lens device capturing a first actual image toward the touch surface after said disposing the first reflection member and the second reflection member;

the first lens device determining whether the first optical axis is shifted according to number of pixels in the first original image, the brightness of the pixels being greater or less than the first brightness threshold.

2. The method of claim 1, wherein the first optical strip and the second optical strip are a mat strip or a reflection strip, the reflectance of the first reflection member and the reflectance of the second reflection member are greater than the reflectance of the first optical strip and the reflectance of the second optical strip, and the step of the first lens device determining whether the first optical axis is shifted according to the number of the pixels in the first actual image comprises:

the first lens device determining that the first optical axis has been shifted when the first lens device detects that the number of the pixels in the first actual image is greater or less than 2, the brightness of the pixels being greater than the first brightness threshold.

3. The method of claim 2, wherein the step of the first lens device setting the first brightness threshold according to the first original image comprises:

the first lens device calculating the first brightness threshold by increasing an average brightness of the first original image according to a specific ratio.

4. The method of claim 1, wherein the first optical strip and the second optical strip are a mat strip or a reflection strip, the reflectance of the first reflection member and the reflectance of the second reflection member are less than the reflectance of the first optical strip and the reflectance of the second optical strip, and the step of the first lens device determining whether the first optical axis is shifted according to the number of the pixels in the first actual image comprises:

the first lens device determining that the first optical axis has been shifted when the first lens device detects that the number of the pixels in the first actual image is greater or less than 2, the brightness of the pixels being less than the first brightness threshold.

5. The method of claim 4, wherein the step of the first lens device setting the first brightness threshold according to the first original image comprises:

the first lens device calculating the first brightness threshold by decreasing an average brightness of the first original image according to a specific ratio.

6. The method of claim 1, wherein the optical touch system further comprises a second light source, a second lens device, and a third optical strip, the second lens device has a second optical axis, the touch surface further has a second corner and a third side, the second corner is opposite to the third side, the second light source and the second lens device are disposed at a position corresponding to the second corner, the third optical strip is disposed at the third side, and the method further comprising:

the second lens device capturing a second original image toward the touch surface;

the second lens device setting a second brightness threshold according to the second original image;

disposing a third reflection member and a fourth reflection member at one end of the first optical strip relatively close to the second corner and one end of the third optical strip relatively close to the second corner respectively, a reflectance of the third reflection member and a reflectance of the fourth reflection member are different from the reflectance of the first optical strip and a reflectance of the third optical strip;

the second lens device capturing a second actual image toward the touch surface after said disposing the third reflection member and the fourth reflection member; and the second lens device determining whether the second optical axis is shifted according to the number of the pixels in the second actual image, the brightness of the pixels being greater or less than the second brightness threshold.

7. The method of claim 6, wherein the first optical strip, the second optical strip and the third optical strip are a mat strip or a reflection strip, the reflectance of the first reflection member, the reflectance of the second reflection member, the reflectance of the third reflection member, and the reflectance of the fourth reflection member are greater than the reflectance of the first optical strip, the reflectance of the second optical strip, and the reflectance of the third optical strip, the first lens device determines that the first optical axis has been shifted when the first lens device detects that the number of the pixels in the first actual image is greater or less than 2, the brightness of the pixels being greater than the first brightness threshold, and the second lens device determines that the second optical axis has been shifted when the second lens device detects that the number of the pixels in the second actual image is greater or less than 2, the brightness of the pixels being greater than the second brightness threshold.

8. The method of claim 7, wherein the step of the first lens device setting the first brightness threshold according to the first original image comprises the first lens device calculating the first brightness threshold by increasing an average brightness of the first original image according to a specific ratio, and the step of the second lens device setting the second brightness threshold according to the second original image comprises the second lens device calculating the second brightness threshold by increasing an average brightness of the second original image according to a specific ratio.

9. The method of claim 6, wherein the first optical strip, the second strip and the third optical strip are a mat strip or a reflection strip, the reflectance of the first reflection member, the reflectance of the second reflection member, the reflectance of the third reflection member, and the reflectance of the fourth reflection member are less than the reflectance of the first optical strip, the reflectance of the second optical strip, and the reflectance of the third optical strip, the first lens device determines that the first optical axis has been shifted when the first lens device detects that the number of the pixels in the first actual image is greater or less than 2, the brightness of the pixels being less than the first brightness threshold, and the second lens device determines that the second optical axis has been shifted when the second lens device detects that the number of the pixels in the second actual image is greater or less than 2, the brightness of the pixels being less than the second brightness threshold.

10. The method of claim 9, wherein the step of the first lens device setting the first brightness threshold according to the first original image comprises the first lens device calculating the first brightness threshold by decreasing an average brightness of the first original image according to a specific ratio, and the step of the second lens device setting the second brightness threshold according to the second original image comprises the second lens device calculating the second brightness threshold by decreasing an average brightness of the second original image according to a specific ratio.

11. An optical touch system for determining whether a lens device is shifted, the optical touch system comprising:
    a screen having a touch surface, the touch surface having a first corner, a first side, and a second side, the first and second sides being opposite to the first corner;
    a first light source disposed at a position corresponding to the first corner for emitting light toward the touch surface;
    a first optical strip disposed at the first side;
    a second optical strip disposed at the second side;
    a first reflection member disposed one end of the first optical strip relatively close to the first corner;
    a second reflection member disposed one end of the second optical strip relatively close to the first corner, a reflectance of the first reflection member and a reflectance of the second reflection member being different from a reflectance of the first optical strip and a reflectance of the second optical strip; and
    a first lens device disposed at a position corresponding to the first corner and having a first optical axis for capturing a first original image toward the touch surface before the first reflection member and the second reflection member disposed in the system actual image after the first reflection member and the second reflection member disposed in the system, the first lens device being further used for setting a first brightness threshold according to the first original image and determining whether the first optical axis is shifted according to number of pixels in the first actual image, the brightness of the pixels being greater or less than the first brightness threshold.

12. The optical touch system of claim 11, wherein the first optical strip and the second optical strip are a mat strip or a reflection strip, the reflectance of the first reflection member and the reflectance of the second reflection member are greater than the reflectance of the first optical strip and the reflectance of the second optical strip, and the first lens device is used for determining that the first optical axis has been shifted when the first lens device detects that the number of the pixels in the first actual image is greater or less than 2, the brightness of the pixels being greater than the first brightness threshold.

13. The optical touch system of claim 12, wherein the first lens device is used for calculating the first brightness threshold by increasing an average brightness of the first original image according to a specific ratio.

14. The optical touch system of claim 11, wherein the first optical strip and the second optical strip are a mat strip or a reflection strip, the reflectance of the first reflection member and the reflectance of the second reflection member are less than the reflectance of the first optical strip and the reflectance of the second optical strip, and the first lens device is used for determining that the first optical axis has been shifted when the first lens device detects that the number of the pixels in the first actual image is greater or less than 2, the brightness of the pixels being less than the first brightness threshold.

15. The optical touch system of claim 14, wherein the first lens device is used for calculating the first brightness threshold by decreasing an average brightness of the first original image according to a specific ratio.

16. The optical touch system of claim 11, wherein the touch surface further has a second corner and a third side, the second corner is opposite to the third side, and the optical touch system further comprises:
    a second light source disposed at a position corresponding to the second corner for emitting light toward the touch surface;
    a third optical strip disposed at the third side;
    a third reflection member disposed at one end of the first optical strip relatively close to the second corner;
    a fourth reflection member disposed at one end of the third optical strip relatively close to the second corner, a reflectance of the third reflection member and a reflectance of the fourth reflection member being different from the reflectance of the first optical strip and a reflectance of the third optical strip; and
    a second lens device disposed at a position corresponding to the second corner and having a second optical axis for capturing a second original image toward the touch surface before the third reflection member and the fourth reflection member disposed in the system and a second actual image after the third reflection member and the fourth reflection member disposed, the second lens device being further used for setting a second brightness threshold according to the second original image and determining whether the second optical axis is shifted according to the number of the pixels in the second actual image, the brightness of the pixels being greater or less than the second brightness threshold.

17. The optical touch system of claim 16, wherein the first optical strip, the second optical strip and the third optical strip are a mat strip or a reflection strip, the reflectance of the first reflection member, the reflectance of the second reflection member, the reflectance of the third reflection member, and the reflectance of the fourth reflection member are greater than the reflectance of the first optical strip, the reflectance of the second optical strip, and the reflectance of the third optical strip, the first lens device is used for determining that the first optical axis has been shifted when the first lens device detects that the number of the pixels in the first actual image is greater or less than 2, the brightness of the pixels being greater than the first brightness threshold, and the second lens device is used for determining that the second optical axis has been shifted when the second lens device detects that the number of the pixels in the second actual image is greater or less than 2, the brightness of the pixels being greater than the second brightness threshold.

18. The optical touch system of claim 17, wherein the first lens device is used for calculating the first brightness threshold by increasing an average brightness of the first original image according to a specific ratio, and the second lens device is used for calculating the second brightness threshold by increasing an average brightness of the second original image according to a specific ratio.

19. The optical touch system of claim 16, wherein the first optical strip, the second optical strip and the third optical strip are a mat strip or a reflection strip, the reflectance of the first reflection member, the reflectance of the second reflection member, the reflectance of the third reflection member, and the reflectance of the fourth reflection member are less than the reflectance of the first optical strip, the reflectance of the second optical strip, and the reflectance of the third optical strip, the first lens device is used for determining that the first optical axis has been shifted when the first lens device detects that the number of the pixels in the first actual image is greater or less than 2, the brightness of the pixels being less than the first brightness threshold, and the second lens device is used for determining that the second optical axis has been shifted when the second lens device detects that the number of the pixels in the second actual image is greater or less than 2, the brightness of pixels being less than the second brightness threshold.

20. The optical touch system of claim 19, wherein the first lens device is used for calculating the first brightness threshold by decreasing an average brightness of the first original image according to a specific ratio, and the second lens device is used for calculating the second brightness threshold by decreasing an average brightness of the second original image according to a specific ratio.

* * * * *